United States Patent
Im

(10) Patent No.: US 12,330,727 B2
(45) Date of Patent: Jun. 17, 2025

(54) REACTION TORQUE CONTROL DEVICE AND METHOD FOR SBW SYSTEM

(71) Applicant: HL MANDO CORPORATION, Pyeongtaek-si (KR)

(72) Inventor: YongHyeon Im, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 195 days.

(21) Appl. No.: 18/091,701

(22) Filed: Dec. 30, 2022

(65) Prior Publication Data

US 2023/0365189 A1    Nov. 16, 2023

(30) Foreign Application Priority Data

May 13, 2022    (KR) .................. 10-2022-0058816

(51) Int. Cl.
  *B62D 6/00*    (2006.01)
  *B62D 5/04*    (2006.01)
  *B62D 6/04*    (2006.01)
  *B62D 15/02*   (2006.01)

(52) U.S. Cl.
  CPC ............. *B62D 6/008* (2013.01); *B62D 6/04* (2013.01); *B62D 15/0225* (2013.01); *B60Y 2400/303* (2013.01); *B62D 5/0466* (2013.01)

(58) Field of Classification Search
  None
  See application file for complete search history.

(56) References Cited

U.S. PATENT DOCUMENTS

| | | | | |
|---|---|---|---|---|
| 6,698,542 B2 * | 3/2004 | Nishizaki | ............... | B60T 8/1755 701/41 |
| 7,137,673 B2 * | 11/2006 | Anwar | .................. | B60T 8/1755 188/164 |
| 7,383,111 B2 * | 6/2008 | Takimoto | ............... | B62D 6/008 701/1 |
| 7,584,042 B2 * | 9/2009 | Suzumura | ............. | B62D 7/159 701/72 |
| 8,989,981 B2 * | 3/2015 | Yamakado | ........... | B60W 10/119 701/72 |
| 9,540,003 B2 * | 1/2017 | Yamakado | ............ | B60W 10/22 |
| 10,099,720 B2 * | 10/2018 | Ramanujam | ......... | B62D 5/0463 |
| 10,214,234 B2 * | 2/2019 | Kim | ..................... | B62D 5/0466 |
| 10,858,040 B2 * | 12/2020 | Hulten | .................. | B62D 6/008 |

(Continued)

FOREIGN PATENT DOCUMENTS

| | | | | |
|---|---|---|---|---|
| CN | 100390003 C | * | 5/2008 | ............ B60K 23/04 |
| DE | 10226683 A1 | * | 12/2003 | ......... B60G 17/0195 |

(Continued)

*Primary Examiner* — Kevin R Steckbauer
(74) *Attorney, Agent, or Firm* — Hauptman Ham, LLP

(57) ABSTRACT

The present document relates to a device and method for controlling a reaction torque of an SBW system, which may include a yaw rate estimator for estimating a yaw rate of a vehicle, a vehicle state determinator for comparing a detection result of a yaw rate detection sensor and a yaw rate estimate which is estimated by the yaw rate estimator to determine whether the vehicle is in an under-steer or over-steer state, and a target torque compensator for compensating for a target torque by using an index which is a determination result of the vehicle state determinator and outputting a final target torque.

14 Claims, 4 Drawing Sheets

(56) References Cited

U.S. PATENT DOCUMENTS

| | | | | |
|---|---|---|---|---|
| 2001/0027893 | A1* | 10/2001 | Nishizaki | B62D 6/00 701/41 |
| 2002/0082762 | A1* | 6/2002 | Tanaka | B60T 8/1755 303/121 |
| 2002/0117347 | A1* | 8/2002 | Nishizaki | B62D 5/07 180/403 |
| 2004/0262991 | A1* | 12/2004 | Anwar | B60T 8/1755 303/140 |
| 2005/0267666 | A1* | 12/2005 | Suzumura | B60T 8/1755 701/70 |
| 2006/0064214 | A1* | 3/2006 | Takimoto | B62D 6/008 701/41 |
| 2012/0179349 | A1* | 7/2012 | Yamakado | B60W 30/045 701/89 |
| 2014/0222309 | A1* | 8/2014 | Yamakado | B60W 10/18 701/89 |
| 2016/0059852 | A1* | 3/2016 | Yamakado | B60W 30/045 701/41 |
| 2017/0232998 | A1* | 8/2017 | Ramanujam | B62D 6/008 701/42 |
| 2018/0186399 | A1* | 7/2018 | Kim | B62D 5/0466 |
| 2019/0047618 | A1* | 2/2019 | Hultén | B60W 10/30 |
| 2023/0365189 | A1* | 11/2023 | Im | B62D 6/008 |

FOREIGN PATENT DOCUMENTS

| | | | | | |
|---|---|---|---|---|---|
| DE | 102013009399 | B4 | * | 7/2024 | B60W 30/02 |
| EP | 1231127 | A2 | * | 8/2002 | B60T 8/1755 |
| EP | 1231127 | B1 | * | 11/2004 | B60T 8/1755 |
| EP | 2484572 | A1 | * | 8/2012 | B60T 8/1755 |
| EP | 2979949 | A1 | * | 2/2016 | B60T 7/12 |
| EP | 2484572 | B1 | * | 7/2017 | B60T 8/1755 |
| EP | 2979949 | B1 | * | 5/2019 | B60T 7/12 |
| JP | 2002240732 | A | * | 8/2002 | B60T 8/1755 |
| JP | 2004075013 | A | * | 3/2004 | B60G 17/0162 |
| JP | 2006007810 | A | * | 1/2006 | |
| JP | 2006088813 | A | * | 4/2006 | B62D 6/008 |
| JP | 4094597 | B2 | * | 6/2008 | B62D 6/008 |
| JP | 2010143303 | A | * | 7/2010 | |
| JP | 2011079395 | A | * | 4/2011 | |
| JP | 5293144 | B2 | | 9/2013 | |
| JP | 2014193691 | A | * | 10/2014 | B60T 7/12 |
| KR | 10-2022-0003474 | A | | 1/2022 | |
| WO | WO-2014156256 | A1 | * | 10/2014 | B60T 7/12 |
| WO | WO-2017135884 | A1 | * | 8/2017 | B60Q 5/005 |
| WO | WO-2024095562 | A1 | * | 5/2024 | |

* cited by examiner

REACTION TORQUE CONTROL DEVICE AND METHOD FOR SBW SYSTEM

CROSS-REFERENCE TO RELATED APPLICATION

This application claims priority to and the benefit of Korean Patent Application No. 10-2022-0058816, filed on May 13, 2022, the disclosure of which is incorporated herein by reference in its entirety.

Technical Field

The present disclosure relates to a device and method for controlling a reaction torque of a steer, and more specifically to a device and method for controlling a reaction torque of a steer-by-wire (SBW) apparatus.

Background Art

As a steering device which is a device for controlling traveling direction of a vehicle, an electronic power steering (hereinafter, referred to as 'EPS') device that provides a steering force required by a steering motor by electronic control has been widely used in recent years.

The EPS steering device operates to rotate a steering column or move a rack bar connected thereto by driving the EPS steering motor according to the steering torque applied to a steering wheel by the driver.

To this end, the EPS steering system includes an EPS steering motor and a steering electronic control unit (ECU) that controls the steering motor, and a constant reducer is connected to the steering motor, and the reducer operates in conjunction with a steering column or a rack bar.

Meanwhile, the steer-by-wire (SBW) steering system of a vehicle refers to a steering system that enables the steering of a vehicle by using an electric motor such as a motor to steer the vehicle instead of removing a mechanical connection device such as a steering column, a universal joint or a pinion shaft between the steering wheel and the wheel.

The SBW system generally includes an upper stage device, a lower stage device and a control device for controlling the same, and the upper stage device may include a torque sensor which is connected to a steering wheel and detects a torque applied to the steering wheel, and a reaction force motor as a motor device for providing a reaction torque to the steering heel according to steering through the lower rack bar. This upper stage device may be expressed as a steering feedback actuator (SPA).

In addition, the lower stage device controls a steering drive motor or a steering drive actuator that drives a pinion gear or a ball nut mechanism for moving a rack bar connected to a tie rod of a wheel to the left and right according to the movement of the steering wheel.

In this SBW system, the upper stage device including a steering wheel, a steering column and an SPA, and the lower stage device including a road wheel actuator (RWA) including a rack bar driving device (a pinion gear, a ball nut, a steering motor driving the same, etc.) operate independently without any mechanical connection therebetween.

Therefore, it is necessary to make the driver feel the steering feeling by rotating the steering wheel connected to the upper stage device according to the movement of the rack bar of the lower stage device where the actual steering is performed, and to this end, the force or torque applied to the steering wheel may be defined as a reaction force or a reaction torque.

Meanwhile, a slip phenomenon in which the vehicle is not steered in a desired direction and moves in the lateral direction may occur due to road surface conditions, wheel imbalance and the like, while the vehicle is running.

When such vehicle slip occurs, an over-steer phenomenon in which the vehicle is steered more than the target steeling angle or an under-steer phenomenon in which the vehicle is steered less than the target steering angle may occur. When the over-steer or under-steer phenomenon occurs, the vehicle deviates from the target trajectory, and accordingly, the driver performs additional steering control to compensate for the over-steer or under-steer. This additional steering control may be referred to as counter-steer.

Meanwhile, the general SBW steering system or EPS steering system may provide an active return function that assists in restoring the steering wheel when the steering wheel returns to the central position after rotating at a constant steering angle.

In the process of performing such an active return function, a torque component that prevents the provision of an appropriate reaction (feedback) torque may occur depending on the road surface condition, and due to this, a phenomenon in which the driver's counter steer is disturbed in the over/under-steer state may occur.

DISCLOSURE

Technical Problem

The technical problem to be solved by the present disclosure in consideration of the above problems is to provide a device and method which are capable of controlling a reaction torque of an SBW system through a simpler operation.

Technical Solution

The device for controlling a reaction torque of an SBW system according to an aspect of the present disclosure for solving the above problems may include a yaw rate estimator for estimating a yaw rate of a vehicle, a vehicle state determinator for comparing a detection result of a yaw rate detection sensor and a yaw rate estimate which is estimated by the yaw rate estimator to determine whether the vehicle is in an under-steer or over-steer state, and a target torque compensator for compensating for a target torque by using an index which is a determination result of the vehicle state determinator and outputting a final target torque.

In an exemplary embodiment of the present disclosure, the yaw rate estimator may estimate a yaw rate of a vehicle by using the detection results of a vehicle speed sensor and a rack position sensor.

In an exemplary embodiment of the present disclosure, the yaw rate estimator estimates a yaw rate by using Mathematical Formula 1 below:

$$\psi[deg/s] = \frac{V}{L + \frac{K \times V^2}{57.3 \times g}} \times (G \times x) \quad \text{[Mathematical Formula 1]}$$

wherein V is the vehicle speed (m/s) detected by a vehicle speed sensor, L is the wheel base length (m) of a vehicle, g is the gravitational acceleration, K is the under-steer gradient (deg/g), G is the converted value (deg/mm), and x is the rack position (mm) detected by a rack position sensor.

In an exemplary embodiment of the present disclosure, the vehicle state determinator may obtains yaw rate difference information by subtracting the estimated yaw rate from a yaw rate detected by the yaw rate detection sensor, and confirm that the vehicle is in a normal state or an abnormal state by using the yaw rate difference information.

In an exemplary embodiment of the present disclosure, the vehicle may be confirmed to be in a normal or abnormal state by comparing an absolute value of the yaw rate difference information with a reference value.

In an exemplary embodiment of the present disclosure, when it is confirmed that the vehicle is in an abnormal state, the vehicle state determinator may confirm whether the sign of the yaw rate difference information and the sign of the yaw rate detected by the yaw rate detection sensor are the same, and if the signs are the same, the vehicle state determinator may determine as an over-steer situation and outputs an index according to the determination result.

In an exemplary embodiment of the present disclosure, when it is confirmed that the vehicle is in an abnormal state, the vehicle state determinator may confirm whether the sign of the yaw rate difference information and the sign of the yaw rate detected by the yaw rate detection sensor are the same, and if the signs are not the same, the vehicle state determinator may determine as an under-steer situation and outputs an index according to the determination result.

In an exemplary embodiment of the present disclosure, the target torque compensator may include a plurality of torque compensators for receiving the index and target torque and respectively compensating for the target torque; and a target torque output unit for outputting a final target torque by adding the outputs of the plurality of target torque compensators.

In an exemplary embodiment of the present disclosure, the torque compensator may compensate for a torque through Mathematical Formula 2 below:

$$T_{comp}=T_{origin}\times\{(1-f)\times Gain+f\}$$ [Mathematical Formula 2]

wherein $T_{comp}$ is the compensated target torque, $T_{origin}$ is the input target torque, f is the index value, and Gain is any adjustable value.

In addition, the method for controlling a reaction torque of an SBW system according to another aspect of the present disclosure may include the steps of a) estimating a yaw rate; b) determining the state of a vehicle by using a yaw rate detected by a yaw rate sensor and the estimated yaw rate; and c) compensating for a target torque by reflecting the determined state of the vehicle.

In an exemplary embodiment of the present disclosure, step a) may estimate a yaw rate by using vehicle speed and rack position detection results.

In an exemplary embodiment of the present disclosure, step a) may estimate a yaw rate by using Mathematical Formula 1 below:

$$\dot{\psi}[deg/s] = \frac{V}{L+\frac{K\times V^2}{57.3\times g}}\times(G\times x)$$ [Mathematical Formula 1]

wherein V is the vehicle speed (m/s) detected by a vehicle speed sensor, L is the wheel base length (m) of a vehicle, g is the gravitational acceleration, K is the under-steer gradient (deg/g), G is the converted value (deg/mm), and x is the rack position (mm) detected by a rack position sensor.

In an exemplary embodiment of the present disclosure, step b) may obtain yaw rate difference information by subtracting the estimated yaw rate from a yaw rate detected by a yaw rate detection sensor, and confirm that the vehicle is in a normal state or an abnormal state by using the yaw rate difference information.

In an exemplary embodiment of the present disclosure, step b) may confirm whether the vehicle is in a normal or abnormal state by comparing an absolute value of the yaw rate difference information with a reference value.

In an exemplary embodiment of the present disclosure, when it is confirmed that the vehicle is in an abnormal state, step b) may confirm whether the sign of the yaw rate difference information and the sign of the yaw rate detected by the yaw rate detection sensor are the same, and if the signs are the same, step b) may determines as an over-steer situation and outputs an index according to the determination result.

In an exemplary embodiment of the present disclosure, when it is confirmed that the vehicle is in an abnormal state, step b) may confirm whether the sign of the yaw rate difference information and the sign of the yaw rate detected by the yaw rate detection sensor are the same, and if the signs are not the same, step b) may determine as an under-steer situation and outputs an index according to the determination result.

In an exemplary embodiment of the present disclosure, step c) may receive the index and target torque, compensate for each target torque through Mathematical Formula 2 below, and output the sum of the compensated target torques:

$$T_{comp}=T_{origin}\times\{(1-f)\times Gain+f\}$$ [Mathematical Formula 2]

wherein $T_{comp}$ is the compensated target torque, $T_{origin}$ is the input target torque, f is the index value, and Gain is any adjustable value.

The method for controlling a reaction torque of an SBW system according to still another aspect of the present disclosure may include the steps of a) estimating a yaw rate by using vehicle speed and rack position detection results detected by a vehicle speed sensor and a rack position sensor, and estimating using Mathematical Formula 1 below, b) determining whether a vehicle is in an over-steer or under-steer state by using a yaw rate detected through a yaw rate sensor and the estimated yaw rate, and c) compensating for the target torque by reflecting the determined state of the vehicle:

$$\dot{\psi}[deg/s] = \frac{V}{L+\frac{K\times V^2}{57.3\times g}}\times(G\times x)$$ [Mathematical Formula 1]

wherein V is the vehicle speed (m/s) detected by a vehicle speed sensor, L is the wheel base length (m) of a vehicle, g is the gravitational acceleration, K is the under-steer gradient (deg/g), G is the converted value (deg/mm), and x is the rack position (mm) detected by a rack position sensor.

In an exemplary embodiment of the present disclosure, when it is confirmed that the vehicle is in an abnormal state, step b) may confirm whether the sign of the yaw rate difference information and the sign of the yaw rate detected by the yaw rate detection sensor are the same, and if the signs are the same, step b) may determine as an over-steer situation, and if the signs are not the same, step b) may determine as an under-steer situation, and output an index according to the determination result.

In an exemplary embodiment of the present disclosure, step c) may receive the index and target torque, compensate for each target torque through Mathematical Formula 2 below, and output the sum of the compensated target torques:

$$T_{comp} = T_{origin} \times \{(1-f) \times \text{Gain} + f\} \quad \text{[Mathematical Formula 2]}$$

wherein $T_{comp}$ is the compensated target torque, $T_{origin}$ is the input target torque, f is the index value, and Gain is any adjustable value.

Advantageous Effects

By detecting the speed of a vehicle and the position of a rack to obtain an estimated yaw rate, the present disclosure confirms the state of the vehicle by comparing the detection values of a yaw rate sensor, and then compensates for a reaction torque, and thus, it has the effects of further simplifying the hardware configuration and simplifying the calculation process.

MODES OF THE INVENTION

Figure 1:
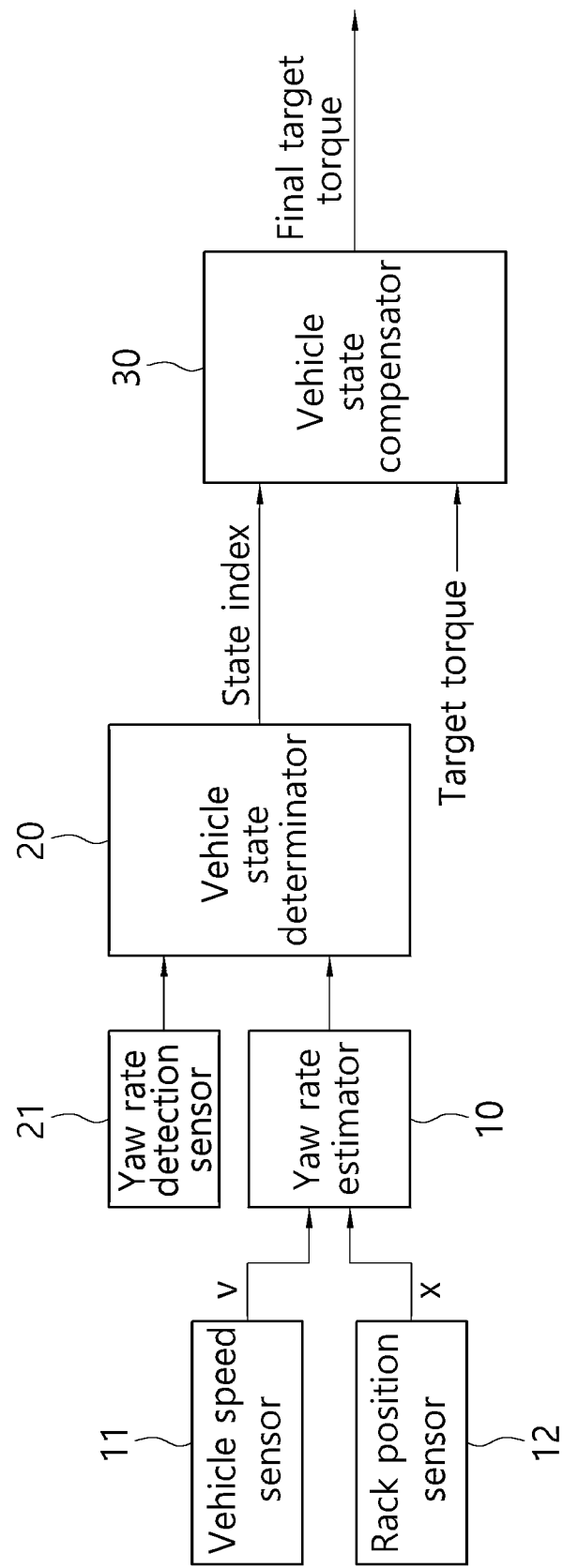
FIG. 1 is a block diagram of the device for controlling a reaction torque of an SBW system according to a preferred exemplary embodiment of the present disclosure.

Hereinafter, the device and method for controlling a reaction torque of an SBW system according to the present disclosure will be described in detail with reference to the accompanying drawings.

Exemplary embodiments of the present disclosure are provided to describe the disclosure more fully to those of ordinary skill in the art. Exemplary embodiments described below may be modified in different forms, and the scope of the present disclosure is not limited thereto. Rather, these exemplary embodiments are provided so that the present disclosure will be thorough and complete and will fully convey the spirit of the present disclosure to those of ordinary skill in the art.

Terms used herein are intended to describe particular exemplary embodiments and are not intended to limit the scope of the present disclosure. Unless the context clearly indicates otherwise, a singular form may include a plural form. As used herein, the terms "comprise" and/or "comprising" specify the presence of mentioned shapes, numbers, steps, operations, members, elements and/or groups thereof, but do not exclude the presence or addition of at least one other shape, number, step, operation, member, element and/ or group thereof. As used herein, the term "and/or" includes any and all combinations of one or more of the associated listed items.

The terms "first," "second" and the like are used to describe various members, areas and/or regions, but do not limit such members, parts, areas, layers and/or regions. These terms do not mean a certain order, top or bottom or priority and are used only to distinguish one member, area or region from another member, area or region. Therefore, a first member, area or region may indicate a second member, area or region without deviating from the spirit of the present disclosure.

Hereinafter, the exemplary embodiments of the present disclosure will be described below with reference to drawings which schematically illustrate the exemplary embodiments. In the drawings, illustrated shapes may change according to, for example, manufacturing technology and/or tolerance. Accordingly, the exemplary embodiments of the present disclosure should not be construed as limited to specific shapes of areas illustrated herein and include changes in shapes that may occur during manufacturing.

FIG. 1 is a block diagram of the device for controlling a reaction torque of an SBW system according to a preferred exemplary embodiment of the present disclosure.

Referring to FIG. 1, the present disclosure includes a yaw rate estimator 10 for using a vehicle speed and to rack position detected by a vehicle speed sensor 11 and a rack position sensor 12, a vehicle state determinator 20 for determining the state of a vehicle by comparing a yaw rate estimate estimated by the yaw rate estimator 10 with a yaw rate detected by a yaw rate detection sensor 21, and a target torque compensator 30 for outputting a final reaction torque by using the vehicle state determined by the vehicle state determinator and the target torque.

Hereinafter, the configuration and operation of the reaction torque control device of the SBW system of the present disclosure configured as described above will be described in more detail.

First, the yaw rate estimator 10 estimates a yaw rate by using data measurable through a sensor and a vehicle dynamics model.

To this end, the yaw rate estimator 10 detects a vehicle speed and a rack position through the vehicle speed sensor 11 and the rack position sensor 12, and estimates the yaw rate of the current vehicle by using a steady-state turning equation.

The yaw rate estimator 10 uses the yaw rate gain formula of the steady-state turning equation defined by Mathematical Formula 1 below, and by reflecting the characteristics of the SBW system, the yaw rate is estimated by using the equation of Mathematical Formula 2 in which the steering angle part of the wheel is substituted by the product of the rack displacement conversion value.

$$\dot{\psi}[deg/s] = \frac{V}{L + \frac{K \times V^2}{57.3 \times g}} \times \delta \quad \text{[Mathematical Formula 1]}$$

$$\dot{\psi}[deg/s] = \frac{V}{L + \frac{K \times V^2}{57.3 \times g}} \times (G \times x) \quad \text{[Mathematical Formula 2]}$$

In Mathematical Formulas 1 and 2 above, V is the vehicle speed (m/s), L is the wheelbase length (m) of a vehicle, g is the gravitational acceleration, K is the under-steer gradient (deg/g), δ is the steer angle (deg) of a vehicle wheel, G is the conversion value (deg/mm), and x is the rack position (mm).

The yaw rate estimator 10 obtains a value of x from the rack position sensor 12 and a value of V from the vehicle speed sensor 11 to calculate a yaw rate estimate.

The yaw rate estimate is provided to the vehicle state determinator 20.

The vehicle state determinator 20 determines the current state of a vehicle by using the yaw rate estimate and the yaw rate detected by the yaw rate detection sensor 21.

The vehicle state determinator 20 calculates yaw rate difference information, which is a difference between the yaw rate of the yaw rate detection sensor 21 and the yaw rate estimate, and compares the yaw rate difference information with a reference value to determine whether the vehicle is in a normal state, or an under-steer or over-steer state.

Figure 2:
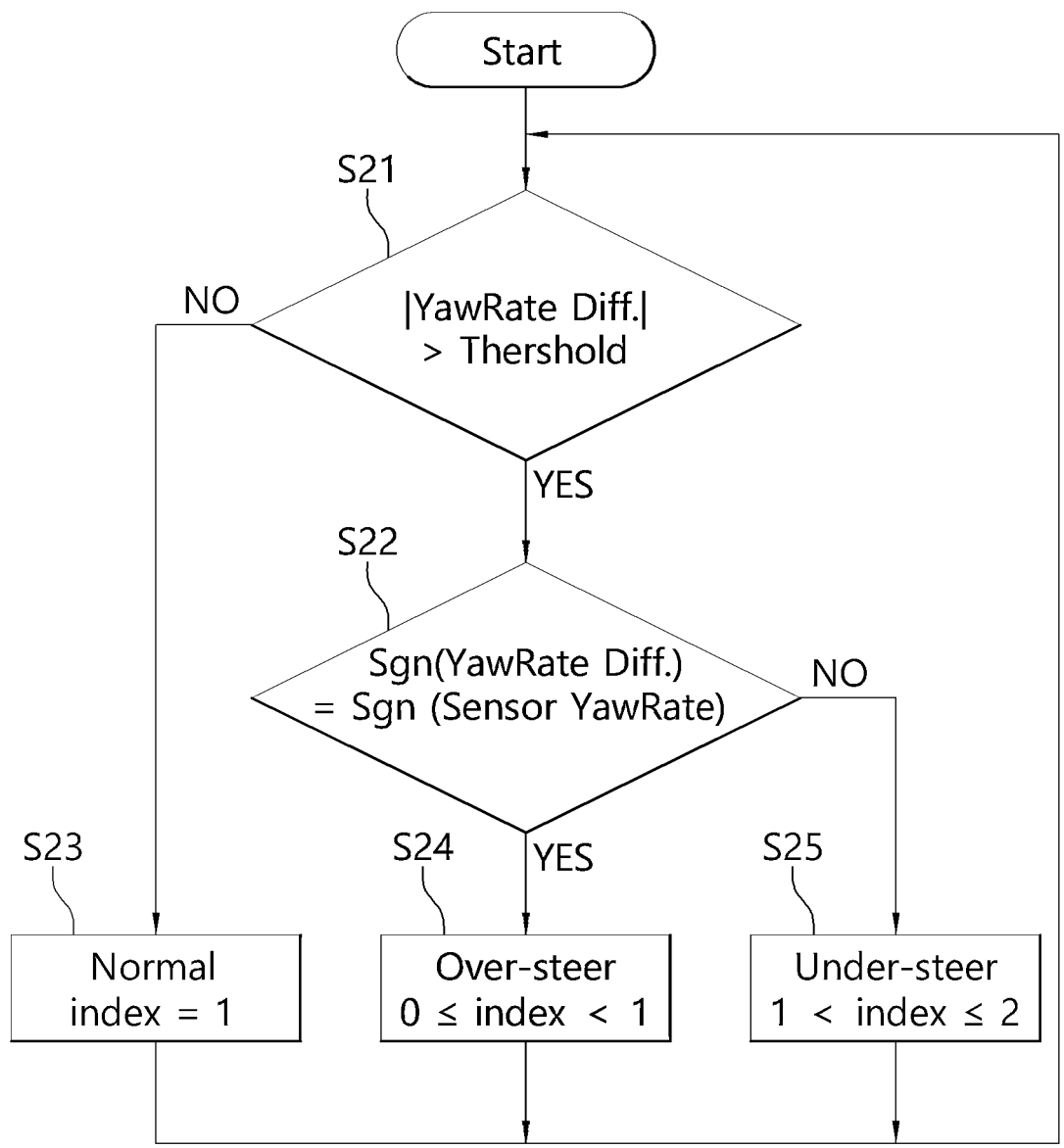
FIG. 2 is an operation flowchart of a vehicle state determinator.

To describe this in more detail, FIG. 2 is a flowchart of the calculation operation of the vehicle state determinator 20.

First, as in step S21, the vehicle state determinator 20 confirms whether the absolute value of the yaw rate difference information (YawRate Diff.) is greater than a reference value (Threshold).

That is, it is determined whether the absolute value of the difference between the detected yaw rate and the yaw rate estimate is greater than a preset reference value to determine whether an abnormal situation has occurred.

If the absolute value of the yaw rate difference information is less than or equal to the reference value, it is determined as a normal state as in step S23, and the index is set to 1 and provided to the target torque compensator 30. The operation of the target torque compensator 30 will be described below.

As a result of the determination in step S21, if the absolute value of the yaw rate difference information is greater than the reference value, it is determined that there is an abnormality as in step S22, and the type of abnormality is confirmed.

In step S21, the size of the yaw rate difference information is simply checked, and in step S22, an over-steer situation or an under-steer situation is determined by using the sign value of the yaw rate difference information.

More specifically, in step S22, it is confirmed whether the sign value of the yaw rate difference information and the sign of the yaw rate detected by the yaw rate detection sensor 21 are the same.

The yaw rate detected by the yaw rate detection sensor 21 also indicates an under-steer or over-steer situation according to a sign.

Figure 3:
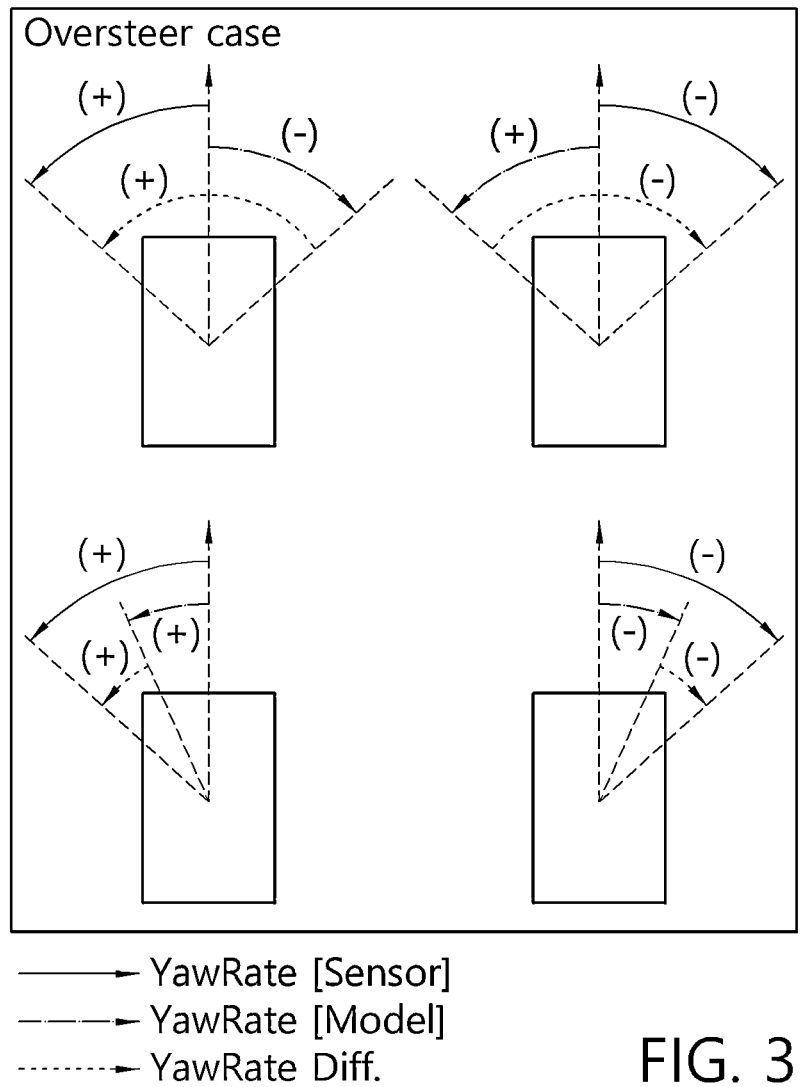
FIG. 3 is an exemplary diagram of an over-steer case determined in the present disclosure.
Figure 4:
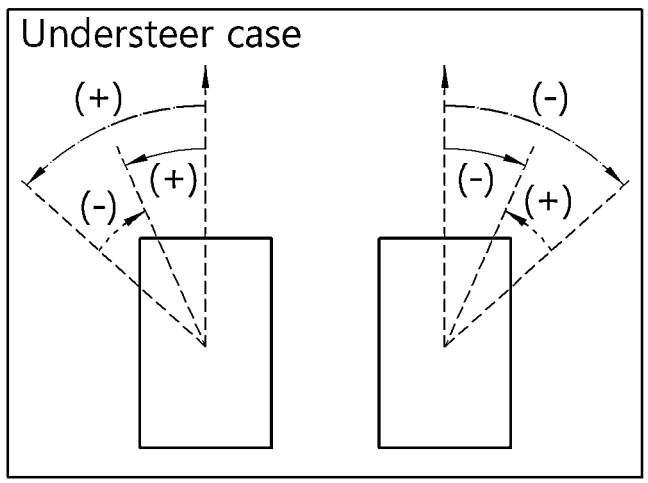
FIG. 4 is an exemplary diagram of an under-steer case determined in the present disclosure.

In accordance with the present disclosure, the cases for determining the over-steer state and the under-steer state of a vehicle are illustrated in FIGS. 3 and 4, respectively.

Referring to FIG. 3, the over-steer state is limited to a case in which the sign of the yaw rate detected by the yaw rate detection sensor 21 is the same as the sign of the yaw rate difference information regardless of the sign of the yaw rate estimate.

In addition, referring to FIG. 4, the under-steer state is limited to a case in which the sign of the yaw rate detected by the yaw rate detection sensor 21 is different from the sign of the yaw rate difference information regardless of the sign of the yaw rate estimate.

Accordingly, it is possible to confirm whether the current vehicle is in an over-steer state or an under-steer state, by checking the sameness of the sign of the yaw rate detected by the yaw rate detection sensor 21 and the sign of the yaw rate difference information in step S22.

In step S24, an index in the case of an over-steer situation is defined, and in step S25, an index in the case of an under-steer situation is defined.

Previously, the index may be defined as 1 in a normal situation of step S23, a value of 0 or more and less than 1 may be defined in an over-steer situation, and a value of more than 1 and less than 2 may be defined in an under-steer situation.

In this case, the indices in the over-steer situation and the under-steer situation are designated as a range, and the index value may be determined according to the size of the yaw rate difference information. As the absolute value of the yaw rate difference information increases, the index value may have a larger value within a corresponding range.

The index value thus determined is input to the target torque compensator 30.

The target torque compensator 30 receives a target torque and compensates the target torque by using the index value.

The target torque is a value generated by the steering angle of the steer, and the target torque compensator 30 compensates the target torque according to the instantaneously changed steering angle by using a target torque function based on the rotation angle at that time, and the final target torque is output by adding the respective compensation results.

Figure 5:
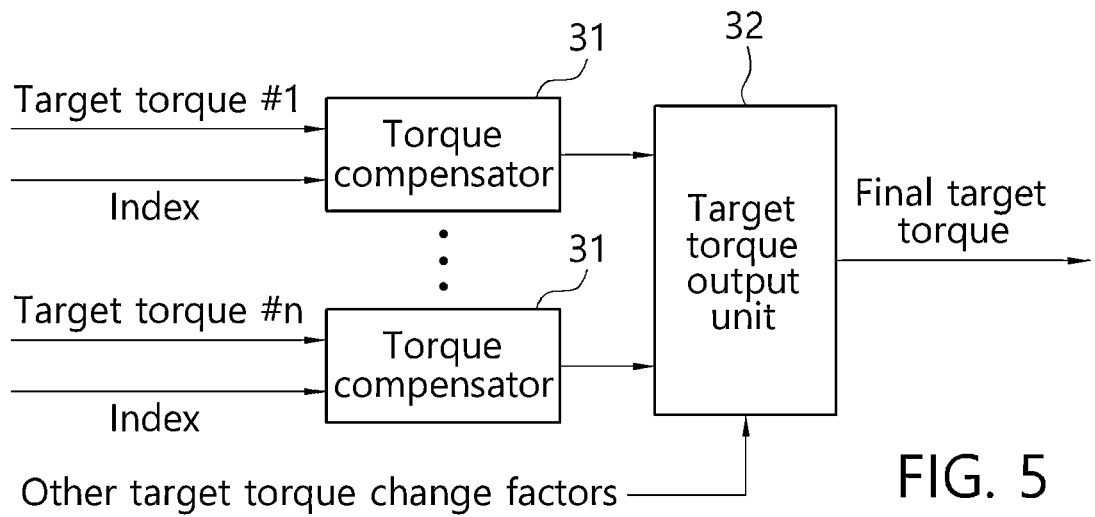
FIG. 5 is a block diagram of a target torque compensator in the present disclosure.

FIG. 5 is a block diagram of the target torque compensator 30.

Referring to FIG. 5, the target torque compensator 30 is configured by including a plurality of torque compensators 31 that generate compensated target torques by using target torques and an index of the vehicle state determinator 20, and a target torque output unit 32 for outputting a final target torque by adding the compensated target torques of the plurality of torque compensators 31.

The target torque output unit 32 may output the target torque change factors that are not considered in the present disclosure by adding them together.

The torque compensator 31 compensates the target torque through Mathematical Formula 3 below.

$$T_{comp} = T_{origin} \times \{(1-f) \times \text{Gain} + f\} \qquad \text{[Mathematical Formula 3]}$$

In Mathematical Formula 3, $T_{comp}$ is the compensated target torque, $T_{origin}$ is the input target torque, f is the index value, and Gain is any adjustable value.

Through such processing, the present disclosure generates a reaction torque that is a steering weight of the steering wheel according to the driving situation of a vehicle such that the driver may accurately recognize the state of the vehicle and the road surface, and by inducing the driver to properly manipulate the steering wheel through the steer operation, it is possible to improve steering and secure vehicle stability.

It will be apparent to those of ordinary skill in the art that the present disclosure is not limited to the above exemplary embodiments and may be variously changed and modified within the scope without departing from the technical gist of the present disclosure.

The invention claimed is:

1. A Steer-By-Wire (SBW) system in a vehicle, the system comprising:
   a motor configured to steer the vehicle; and
   a controller configured to:
   determine a first yaw rate based on a vehicle speed from a vehicle speed sensor in the vehicle and a rack position from a rack position sensor in the vehicle,
   determine an index indicating whether the vehicle is under-steered or over-steered based on the first yaw rate and a second yaw rate from a yaw rate sensor in the vehicle,
   determine a plurality of first target torques based on the index and a plurality of input target torques of the motor, the first target torque including a torque obtained by compensating the input target torque using the index,
   determine a second target torque by adding the plurality of the first target torques,
   generate a final target torque signal based on the second target torque, and
   apply the final target torque signal to the motor.

2. The system of claim 1, wherein the controller is configured to determine the first yaw rate by using Mathematical Formula 1 below:

$$\dot{\psi}[deg/s] = \frac{V}{L + \frac{K \times V^2}{57.3 \times g}} \times (G \times x) \quad \text{[Mathematical Formula 1]}$$

wherein V is the vehicle speed (m/s) from the vehicle speed sensor, L is a wheel base length (m) of the vehicle, g is the gravitational acceleration, K is an under-steer gradient (deg/g), G is a converted value (deg/mm), and x is the rack position (mm) from the rack position sensor.

3. The system of claim 1, wherein the controller is further configured to:
  determine difference information by subtracting the first yaw rate from the second yaw rate,
  compare an absolute value of the difference information with a threshold, and
  determine whether the vehicle is in a normal state or an abnormal state based on the comparison.

4. The system of claim 3, wherein the controller is further configured to:
  determine the vehicle to be in the normal state in the case that the absolute value is equal or less than the threshold, or
  determine the vehicle to be in the abnormal state in the case that the absolute value is greater than the threshold.

5. The system of claim 4, wherein the controller is further configured to:
  determine whether a first sign of the difference information is the same as a second sign of the second yaw rate when the vehicle is in the abnormal state,
  determine that the vehicle is over-steered when the first sign is the same as the second sign, and
  determine the index indicating that the vehicle is over-steered.

6. The system of claim 4, wherein the controller is further configured to:
  determine whether a first sign of the difference information is the same as a second sign of the second yaw rate when the vehicle is in the abnormal state,
  determine that the vehicle is under-steered when the first sign is different from the second sign, and
  determine the index indicating that the vehicle is under-steered.

7. The system of claim 1, wherein the controller is configured to determine the second target torque through Mathematical Formula 2 below:

$$T_{comp} = T_{origin} \times \{(1-f) \times \text{Gain} + f\} \quad \text{[Mathematical Formula 2]}$$

wherein $T_{comp}$ is the second target torque, $T_{origin}$ is the first target torque, f is the index, and Gain is any adjustable value.

8. A method for controlling a motor configured to steer a vehicle, the method comprising:
  determining a first yaw rate based on a vehicle speed from a vehicle speed sensor in the vehicle and a rack position from a rack position sensor in the vehicle;
  determining an index indicating whether the vehicle is under-steered or over-steered based on the first yaw rate and a second yaw rate from a yaw rate sensor in the vehicle;
  determining a plurality of first target torques based on the index and a plurality of input target torques of the motor, the first target torque including a torque obtained by compensating the input target torque using the index;
  determining a second target torque by adding the plurality of the first target torques;
  generating a final target torque signal based on the second target torque; and
  applying the final target torque signal to the motor.

9. The method of claim 8, wherein the first yaw rate is determined by using Mathematical Formula 1 below:

$$\dot{\psi}[deg/s] = \frac{V}{L + \frac{K \times V^2}{57.3 \times g}} \times (G \times x) \quad \text{[Mathematical Formula 1]}$$

wherein V is the vehicle speed (m/s) from the vehicle speed sensor, L is a wheel base length (m) of the vehicle, g is the gravitational acceleration, K is an under-steer gradient (deg/g), G is a converted value (deg/mm), and x is the rack position (mm) from the rack position sensor.

10. The method of claim 8, wherein the determining the index comprises:
  determining difference information by subtracting the first yaw rate from the second yaw rate,
  comparing an absolute value of the difference information with a threshold, and
  determining whether the vehicle is in a normal state or an abnormal state based on the comparison.

11. The method of claim 10, wherein the determining whether the vehicle is in the normal state or the abnormal state comprises:
  determining the vehicle to be in the normal state in the case that the absolute value is equal to or less than the threshold, or
  determining the vehicle to be in the abnormal state in the case that the absolute value is greater than the threshold.

12. The method of claim 11, wherein the determining whether the vehicle is in the normal state or the abnormal state further comprises:
  determining whether a first sign of the difference information is the same as a second sign of the second yaw rate when the vehicle is in the abnormal state,
  determining that the vehicle is over-steered when the first sign is the same as the second sign, and
  determining the index indicating that the vehicle is over-steered.

13. The method of claim 11, wherein the determining whether the vehicle is in the normal state or the abnormal state further comprises:
  determining whether a first sign of the difference information is the same as a second sign of the second yaw rate when the vehicle is in the abnormal state,
  determining that the vehicle is under-steered when the first sign is different from the second sign, and
  determining the index indicating that the vehicle is under-steered.

14. The method of claim 8, wherein the second target torque is determined through Mathematical Formula 2 below:

$$T_{comp} = T_{origin} \times \{(1-f) \times \text{Gain} + f\} \quad \text{[Mathematical Formula 2]}$$

wherein $T_{comp}$ is the second target torque, $T_{origin}$ is the first target torque, f is the index, and Gain is any adjustable value.

\* \* \* \* \*